(12) United States Patent
Kim et al.

(10) Patent No.: US 8,798,033 B2
(45) Date of Patent: Aug. 5, 2014

(54) SYSTEM AND METHOD FOR MINIMIZING SIGNAL INTERFERENCE BETWEEN BROADCASTING SIGNALS AND COMMUNICATION SIGNALS WITHIN LOCAL AREA AND APPARATUS APPLIED TO THE SAME

(75) Inventors: Moon Kee Kim, Yongin-si (KR); Cheol Ho Yim, Daejeon (KR); Kyung Sik Han, Yongin-si (KR); Keun Hwan Choi, Seoul (KR); Jae Yeon Noh, Seongnam-si (KR); Jae Hwang Yu, Seoul (KR); Min Seok Kim, Seoul (KR)

(73) Assignee: SK Telecom Co., Ltd., Seoul (KR)

( * ) Notice: Subject to any disclaimer, the term of this patent is extended or adjusted under 35 U.S.C. 154(b) by 1 day.

(21) Appl. No.: 13/414,181

(22) Filed: Mar. 7, 2012

(65) Prior Publication Data

US 2012/0163363 A1 Jun. 28, 2012

Related U.S. Application Data

(63) Continuation of application No. PCT/KR2009/006292, filed on Oct. 29, 2009.

(30) Foreign Application Priority Data

Sep. 7, 2009 (KR) .................. 10-2009-0084003

(51) Int. Cl.
*H04W 72/04* (2009.01)
*H04W 72/12* (2009.01)

(52) U.S. Cl.
USPC ............................ 370/350; 370/336; 370/338

(58) Field of Classification Search
CPC ... H04W 72/08; H04W 72/005; H04W 72/12; H04W 72/04

USPC .................................. 370/336, 338, 350, 390
See application file for complete search history.

(56) References Cited

U.S. PATENT DOCUMENTS 7,899,915 B2 * 3/2011 Reisman ....................... 709/228
2004/0095461 A1 * 5/2004 Monagahn et al. ........ 348/14.08

(Continued)

FOREIGN PATENT DOCUMENTS

CN 101371543 A 2/2009
KR 10-2006-0009431 2/2006

(Continued)

OTHER PUBLICATIONS

International Search Report mailed Oct. 6, 2010 for PCT/KR2009/006292.

(Continued)

*Primary Examiner* — John Pezzlo
(74) *Attorney, Agent, or Firm* — Lowe Hauptman & Ham, LLP (57) ABSTRACT

Disclosed is a system and a method for minimizing signal interference for a broadcasting and communication convergence section within a local area, and an apparatus applied to the same. The system has a construction of mounting a plurality of multi RF (Radio Frequency) channels within a local area wireless communication apparatus located in a local area and minimizing signal interference between mutually adjacent RF channels within the local area wireless communication apparatus in a standard for providing a broadcasting and communication convergence service. Accordingly, it is possible to remove the mutual channel effects affecting a communication signal without signal interference for adjacent channels due to a broadcasting signal and it is not necessary to enhance a filtering characteristic for the adjacent channels of a chipset, which corresponds to a broadcasting and communication convergence standard structure in a local area, so that there is an advantage of reducing network investment costs.

6 Claims, 6 Drawing Sheets

(56) References Cited

U.S. PATENT DOCUMENTS

| | | |
|---|---|---|
| 2006/0285483 A1* | 12/2006 | Khan .......................... 370/208 |
| 2007/0002724 A1* | 1/2007 | Khan .......................... 370/203 |
| 2008/0032744 A1* | 2/2008 | Khan et al. ................ 455/562.1 |
| 2008/0095221 A1* | 4/2008 | Picard .......................... 375/224 |
| 2009/0240998 A1* | 9/2009 | Nikkila et al. ................ 714/746 |
| 2009/0279563 A1* | 11/2009 | Sampath et al. ............. 370/432 |
| 2009/0316614 A1* | 12/2009 | Kim et al. ..................... 370/312 |
| 2010/0293286 A1* | 11/2010 | Nikkila et al. ................ 709/231 |
| 2011/0188441 A1* | 8/2011 | Kim et al. ..................... 370/312 |

FOREIGN PATENT DOCUMENTS

| | | |
|---|---|---|
| KR | 10-2007-0092386 | 9/2007 |
| KR | 10-0828297 | 5/2008 |
| KR | 10-2009-0091892 | 8/2009 |

OTHER PUBLICATIONS

Chinese Office Action for application No. 200980162351.X dated Mar. 27, 2014.

* cited by examiner

SYSTEM AND METHOD FOR MINIMIZING SIGNAL INTERFERENCE BETWEEN BROADCASTING SIGNALS AND COMMUNICATION SIGNALS WITHIN LOCAL AREA AND APPARATUS APPLIED TO THE SAME

CROSS REFERENCE TO RELATED APPLICATION

Related Applications

The present application is a continuation of International Application Number PCT/KR2009/006292 filed Oct. 29, 2009, the disclosure of which is hereby incorporated by reference herein in their entirety. Further, this application claims the priority of Korean Patent Application No. 10-2009-0084003, filed on Sep. 7, 2009 in the KIPO (Korean Intellectual Property Office), the disclosure of which are incorporated herein in their entirety by reference.

FIELD OF THE INVENTION

The present invention relates to a system and a method for minimizing signal interference for broadcasting signals and communication signals within a local area, and an apparatus applied to the same. More particularly, the present invention relates to a system and a method for minimizing signal interference between broadcasting signals and communication signals within a local area, which includes a plurality of multi RF (Radio Frequency) channels and minimizes signal interference between mutually adjacent RF channels in a standard for providing a broadcasting and communication convergence service, and an apparatus applied to the same.

DESCRIPTION OF THE PRIOR ART

Recently, various types of services are provided through local area wireless communication such as WPAN/WLAN (Wireless Personal Area Network/Wireless Local Area Network).

A WPAN/WLAN technology such as Zigbee, Wi-Fi, and Bluetooth can be implemented at low costs and uses ISM (Industrial/Scientific/Medical) bands which are available for anyone. In addition, a standard of filtering for an interference signal transmitted through an adjacent channel in the WPAN/WLAN technology, is worse than a standard of interference between RF channels of mobile communication.

Meanwhile, the tendency toward the standardization for adding a broadcasting function to the WPAN/WLAN is rising, and an attempt is made to provide a broadcasting and communication convergence service on a local area, such as the WPAN/WLAN.

Accordingly, in the case of broadcasting signal within a local area, if an interference signal, which affects adjacent channels, is not removed, transmitting/receiving performance of a communication signal based on bidirectional communication is deteriorated and coverage related to a communication service is rapidly reduced due to the interference.

Therefore, a solution is required to overcome the problems.

SUMMARY OF THE INVENTION

Accordingly, the present invention has been made to solve the above-mentioned problems occurring in the prior art, and an aspect of the present invention provides a system and a method for minimizing signal interference for a broadcasting-communication convergence within a local area, which includes a plurality of multi RF (Radio Frequency) channels and minimizes signal interference between mutually adjacent RF channels within a local area wireless communication unit in a standard for providing a broadcasting and communication convergence service, and an apparatus applied to the same.

Further, another aspect of the present invention provides a system and a method for minimizing signal interference for a broadcasting-communication convergence service within a local area, which can minimize signal interference between channels without enhancing a filtering characteristic.

In accordance with an aspect of the present invention, there is provided a system for minimizing signal interference between a broadcasting signal and communication signal within a local area, the system comprising: a local area wireless communication apparatus for multiplexing broadcasting signals corresponding to contents to be broadcasted within a local area such that the broadcasting signals correspond to two or more multi RF (Radio Frequency) channels, synchronizing two or more broadcasting frames of the broadcasting signals of each of the two or more multi RF channels on a time axis, and then transmitting the broadcasting signals within the local area through the two or more multi RF channels; and one or more user terminal apparatuses for receiving the broadcasting signals when the one or more user terminal are located the local area, wherein, when one of the one or more user terminal apparatus is connected with the local area wireless communication apparatus through a communication access using one multi RF channel of the two or more multi RF channels, the local area wireless communication apparatus consecutively allocates a communication frame for a communication signal to be communicated through the communication access after the broadcasting frame, allocates a bidirectional communication frame for the remaining multi RF channels of the two or more multi RF channels such that the bidirectional communication frame is synchronized with the communication frame on a time axis, and communicate the communication signal.

The multi RF channels may transmit the broadcasting signals to the local area in a pre-allocated frequency band or communicate the communication signals with one of the one or more user terminal apparatus.

In accordance with another aspect of the present invention, there is provided a local area wireless communication apparatus comprising: two or more local area wireless communication unit configured to transmit broadcasting signals to a local area through two or more multi RF channels and to communicate communication signals with one or more user terminal apparatuses located in the local area using one of the two or more multi RF channels; and a controller configured to synchronize two or more broadcasting frames for the broadcasting signals of each of the two or more RF channels on a time axis, and, when communication frame for the communication signals are allocated for one RF channel of the two or more multi RF channels, to allocate a bidirectional communication frame for the remaining RF channels of the two or more multi RF channels such that the bidirectional communication frame is synchronized with the communication frame on a time axis.

The local area wireless communication apparatus may further include a network connector configured to connect the local area wireless communication apparatus with a network providing contents to be broadcasted.

The local area wireless communication unit may include a chipset comprising a control circuit configured to receive the broadcasting signals and to transmit the received broadcasting signals to the local area or to communicate the communication signals through a communication access with the user terminal apparatus; an RF module configured to generate the broadcasting signals or the communication signals; and at least one antenna configured to transmit the broadcasting signals within the local area or to communicate the communication signals.

The controller may allocate the broadcasting frame and the communication frame according to a preset allocation ratio.

In accordance with another aspect of the present invention, there is provided a method of minimizing interference between broadcasting signals and communication signals within a local area, the method comprising: multiplexing broadcasting signals corresponding to contents to be broadcasted within a local area such that the broadcasting signals correspond to two or more multi RF (Radio Frequency) channels by a local area wireless communication apparatus; synchronizing two or more broadcasting frames of the broadcasting signals for each of the two or more multi RF channels on a time axis; transmitting the broadcasting signals within the local area through the two or more multi RF channels; responding to a communication access using one multi RF channel of the two or more multi RF channels by one or more user terminal apparatus located in the local area; allocating a communication frame for a communication signal to be communicated through the communication access after the broadcasting frame; allocating a bidirectional communication frame for the remaining multi RF channels of the two or more multi RF channels such that the bidirectional communication frame is synchronized with the communication frame on a time axis; and communicating the communication signal.

The method may further include connecting with a network so that receiving contents from the network.

According to the present invention, it is possible to minimize signal interference between mutually adjacent RF channels of the local area wireless communication apparatus in a standard for a broadcasting and communication convergence service. As a result, the mutual channel effects affecting a communication signal can be removed with minimized signal interference of adjacent channels due to a broadcasting signal. In addition, it is not necessary to improve filtering characteristic of a chipset for removing interference effects, so that there is an advantage of reducing network investment costs.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF AN EXEMPLARY EMBODIMENT

Hereinafter, an exemplary embodiment of the present invention will be described with reference to the accompanying drawings. In the following description and drawings, the same reference numerals are used to designate the same or similar components, and so repetition of the description on the same or similar components will be omitted.

Figure 1:
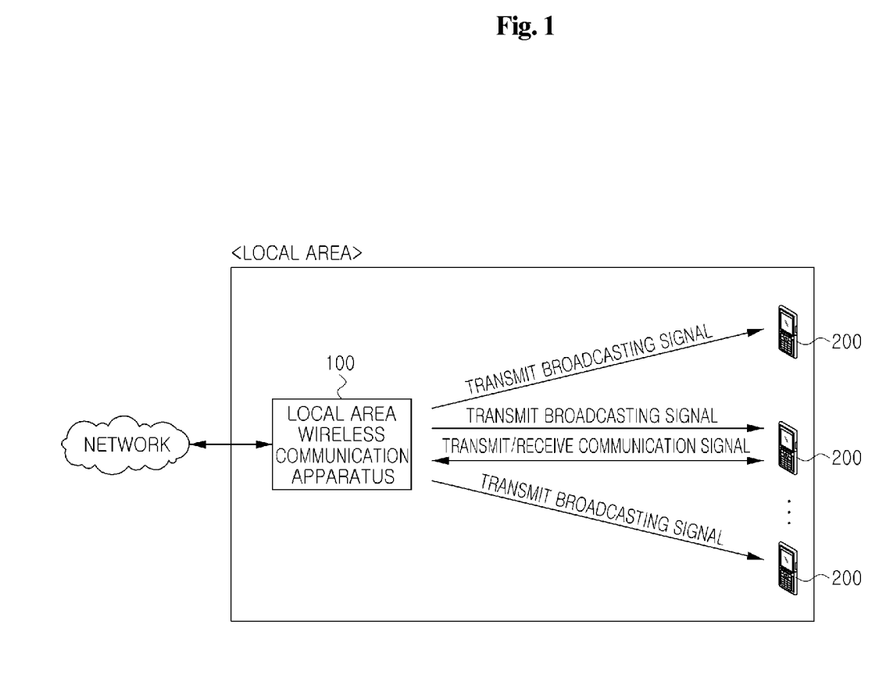
FIG. 1 illustrates a system for minimizing signal interference for a broadcasting and communication convergence section within a local area according to an embodiment of the present invention.

FIG. 1 illustrates a system for minimizing signal interference for a broadcasting and communication convergence section within a local area according to an embodiment of the present invention. As shown in FIG. 1 for illustration only, the system for minimizing signal interference for the broadcasting and communication convergence service within the local area includes a local area wireless communication apparatus 100 for receiving contents using the communication connection with a network such as the Internet and transmitting the contents within a corresponding local area in a broadcasting manner and one or more user terminal apparatuses 200 for receiving broadcasted contents, the one or more user terminal apparatuses being located in a local area.

In order to transmit contents received through the two or more multi RF channels by means of broadcasting signals, the local area wireless communication apparatus 100 multiplexes the broadcasting signals in such a manner that the broadcasting signals correspond to two or more multi RF channels.

Here, it is assumed and described that the two or more multi RF channels are three multi RF channels.

The local area wireless communication apparatus 100 generates three broadcasting frames for the broadcasting signals, which are to be broadcasted within the local area through the three multi RF channels. The broadcasting frames may be synchronized with each other based on a time axis of transmission frames of the three generated broadcasting frames.

Thereafter, the local area wireless communication apparatus 100 broadcasts the mutually synchronized broadcasting signals to the local area through the three multi RF channels, respectively.

Here, in most cases, the broadcasting signal corresponds to traffic such as a multimedia stream.

The user terminal apparatus 200 located in the local area receives a broadcasting signal and then requests a communication access through one of the three multi RF channels for various purpose such as receiving an additional service related to contents associated with the broadcasting signal.

In this event, the local area wireless communication apparatus 100 allocates communication frame for communication signals in response to a request for the communication access by the user terminal apparatus 200.

The communication frame is consecutively allocated after the broadcasting frame in the transmission frames.

The local area wireless communication apparatus 100 allocates bidirectional communication frames to the remaining two multi RF channels except for one of the three multi RF channel, in which the communication frame are already allocated as described above. The bidirectional communication frames are synchronized with the first allocated communication frame on the time axis.

As a result of the above process, the transmission frames of the three multi RF channels have a frame structure in which broadcasting frame for transmitting broadcasting signals are synchronized with each other or communication frame areas for communication signals are synchronized with the bidirectional communication frames.

Accordingly, it is possible to minimize an interference effect in adjacent channels due to a broadcasting signal through the time synchronization between the broadcasting signals and between the communication signals.

Figure 2:
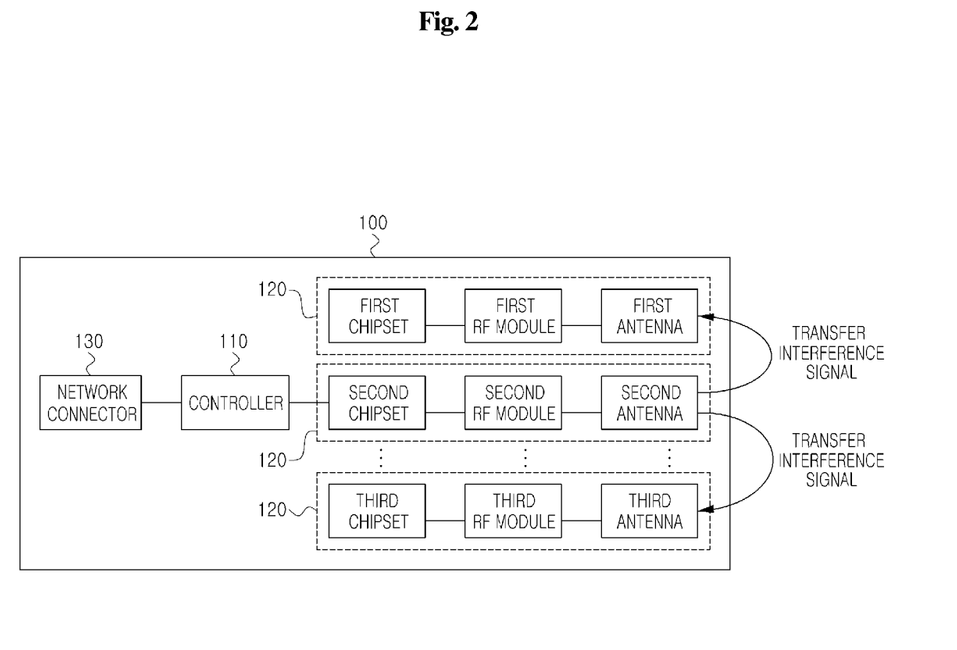
FIG. 2 illustrates a local area wireless communication apparatus as shown in FIG. 1.

FIG. 2 illustrates a local area wireless communication apparatus 100 as shown in FIG. 1. As shown in FIG. 2 for illustration only, the local area wireless communication apparatus 100 includes one local area wireless communication unit of three local area wireless communication units 120 for transmitting broadcasting signals corresponding to contents to a local area through a corresponding multi RF channel among three multi RF channels and transmitting/receiving communication signals to/from one or more user terminal apparatuses 200 located in the local area, and a controller 110 for configuring the broadcasting frames for three multiplexed broadcasting signals to be synchronized on the time axis with respect to the three multi RF channels, and, and, when communication frame for the communication signals are allocated for one multi RF channel of the three multi RF channels, allocating a bidirectional communication frame for the remaining multi RF channels of the three multi RF channels such that the bidirectional communication frame is synchronized with the communication frame on a time axis Furthermore, it is preferable that the local area wireless communication apparatus 100 further includes a network connector 130 for receiving contents through a network such as the Internet.

Each of the three local area wireless communication units 120 includes a chipset comprising a control circuit for receiving the broadcasting signals and transmitting the received broadcasting signals to the local area or communicating the communication signals through a communication access with the user terminal apparatus; an RF module for generating the broadcasting signals or the communication signals such that the broadcasting signals or the communication signals are appropriate for a local area; and antennas for transmitting the broadcasting signals within the local area or communicating the communication signals.

Further, the controller 110 can allocate broadcasting frames and communication frames of each transmission frame according to a preset allocation ratio (for example 7:3).

Figure 3:
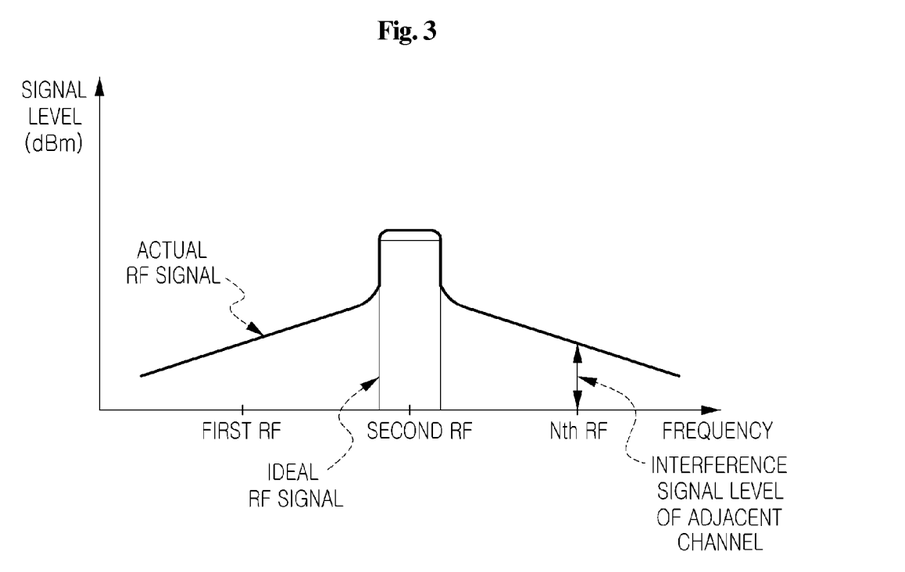
FIG. 3 illustrates a case where signal interference is caused between multi RF channels.

FIG. 3 illustrates a case where signal interference is caused between multi RF channels. As shown in FIG. 3 for illustration only, when an RF signal is transmitted through a second multi RF channel, the RF signal is transmitted with the occurrence of an interference signal caused in adjacent channels such as a first multi RF channel and a third multi RF channel, rather than ideally transmitted only in a corresponding RF band.

Accordingly, when a signal transmitted through the second multi RF channel is a broadcasting signal and a bidirectional communication service is implemented through the first multi RF channel and the third multi RF channel, the quality of the bidirectional communication service may be deteriorated due to the interference with the broadcasting signal.

Figure 4:
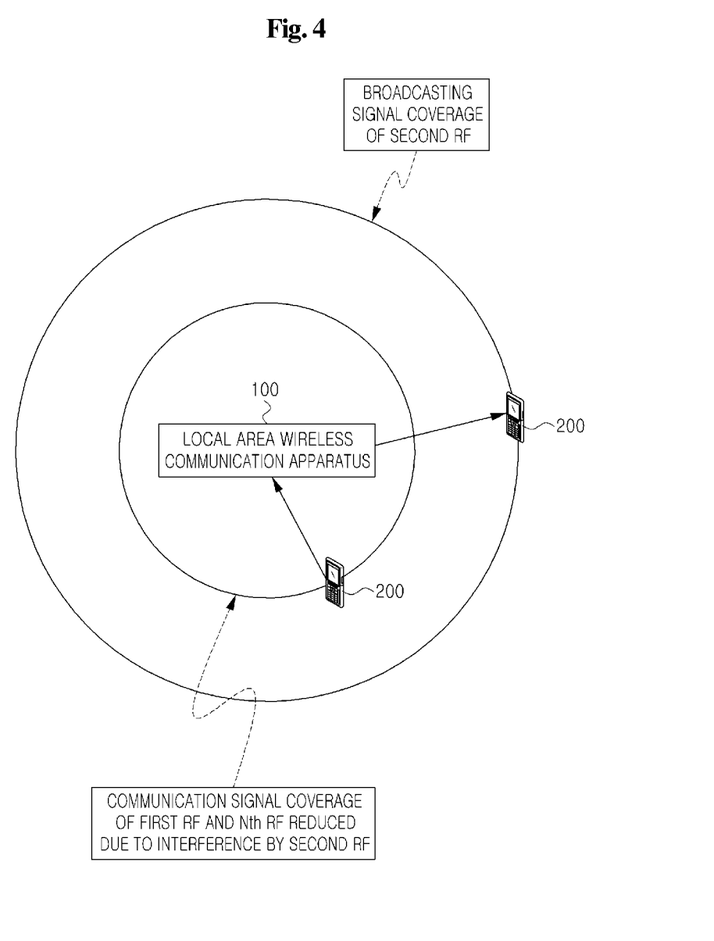
FIG. 4 illustrates a case where the coverage of a communication signal is reduced in comparison with the coverage of a broadcasting signal according to the occurrence of signal interference between multi RF channels.

FIG. 4 illustrates a case where the coverage of a communication signal is reduced in comparison with the coverage of a broadcasting signal due to the signal interference between multi RF channels. As shown in FIG. 4 for illustration only, when a signal transmitted through the second multi RF channel is a broadcasting signal and a bidirectional communication service is implemented through the first multi RF channel and the third multi RF channel, the coverage of the communication signals through the first multi RF channel and the third multi RF channel is reduced in comparison with the coverage of the broadcasting signal.

Accordingly, in order to implement the communication service through the first multi RF channel and the third multi RF channel, the user terminal apparatus 200 accessing the channels should use higher outputs, because the coverage for the communication signal is reduced as shown in FIG. 4.

Figure 5:
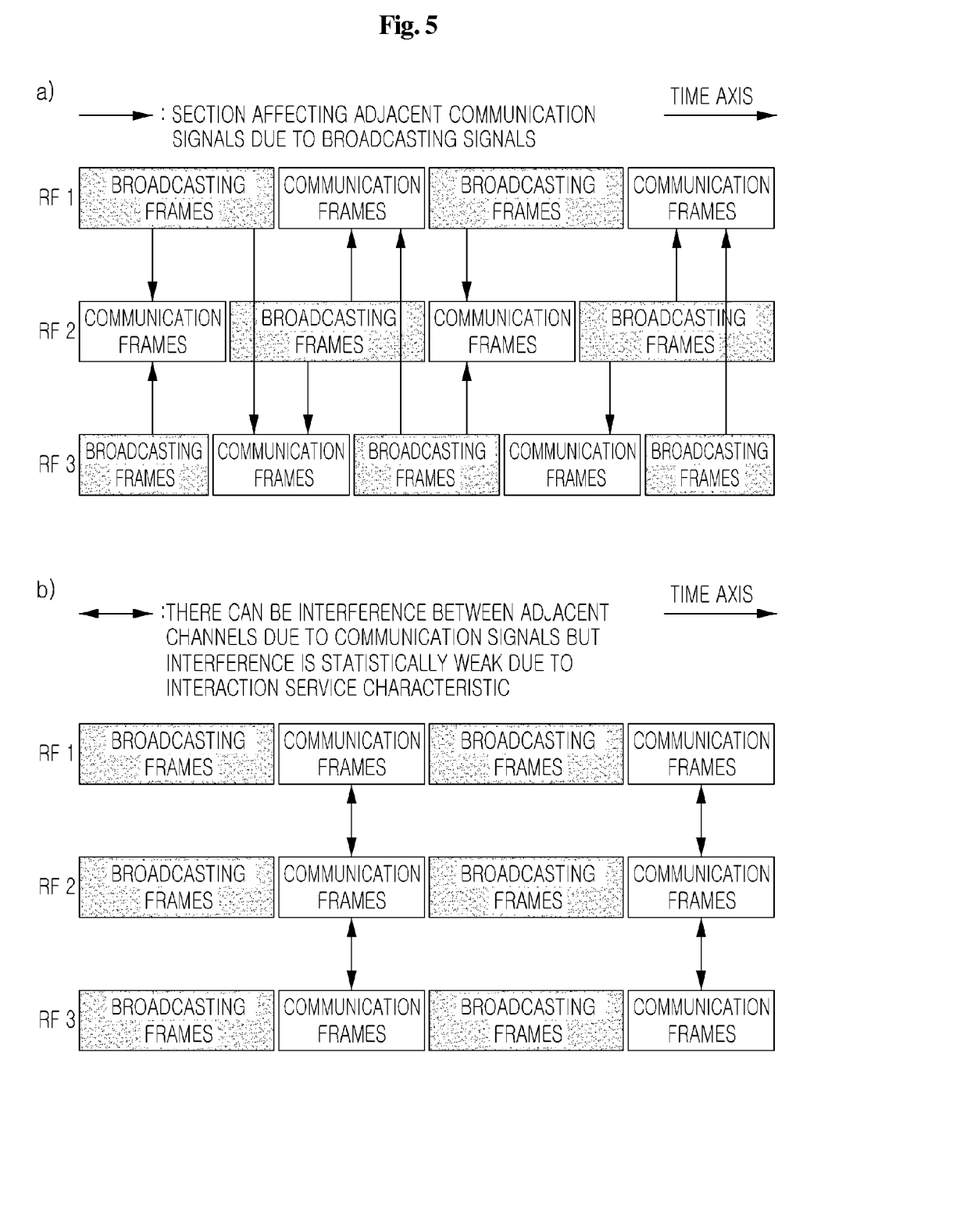
FIG. 5 illustrates a transmission frame structure between multi RF channels configured through the local area wireless communication apparatus shown in FIG. 1.

FIG. 5 illustrates a transmission frame structure between multi RF channels configured by the local area wireless communication apparatus 100 shown in FIG. 1. As shown in FIG. 5 for illustration only, there is a case in the local area wireless communication apparatus 100 where broadcasting frames for broadcasting signals cause interference against adjacent channels including communication frames for transmitting/receiving communication signals (a).

However, the local area wireless communication apparatus 100 performs an additional control for a transmission frame structure, which can avoid a situation such as (a). The additional control corresponds to a processing of a frame structure for synchronizing broadcasting frames for broadcasting signals with each other or synchronizing communication frames for transmitting/receiving communication signals with each other.

Meanwhile, there can be interference between adjacent channels due to communication signals. However, the effect of interference due to communication signals is statistically small because there are gaps between transmission/reception signals because of the characteristics of the bidirectional communication service (b).

Figure 6:
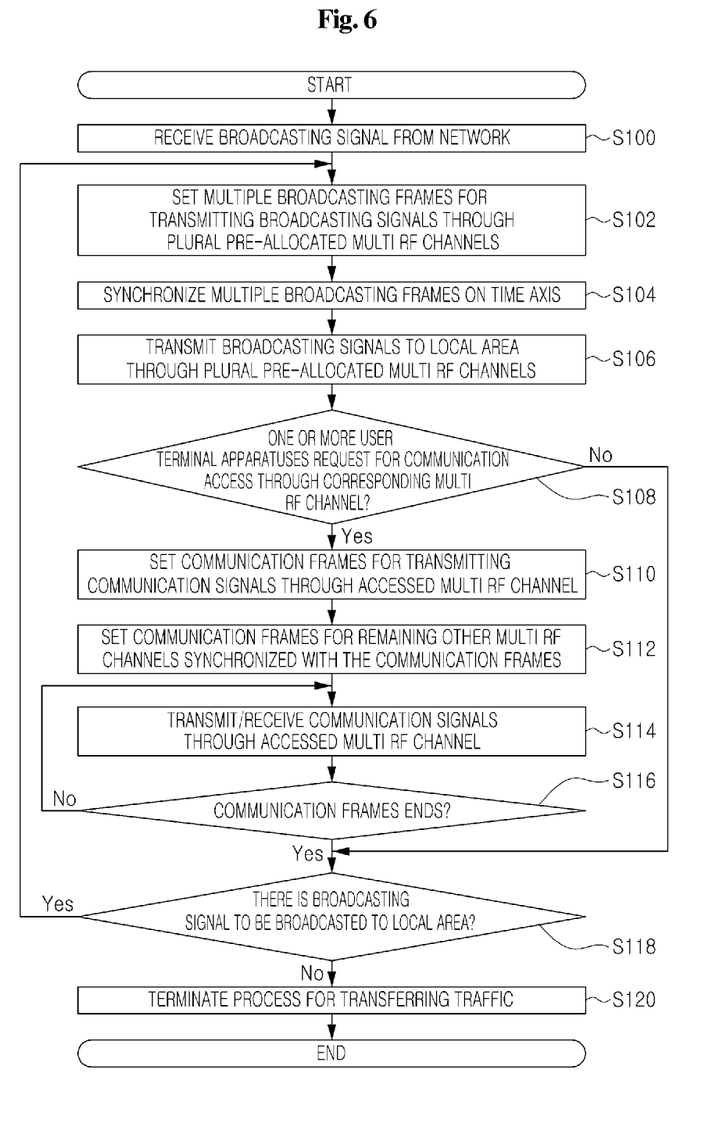
FIG. 6 is a flowchart illustrating an operation process of the system for minimizing signal interference for the broadcasting and communication convergence section within the local area shown in FIG. 1.

FIG. 6 is a flowchart illustrating an operation process of the system for minimizing signal interference for the broadcasting and communication convergence service within the local area shown in FIG. 1. As shown in FIG. 6 for illustration only, a method of minimizing signal interference for the broadcasting and communication convergence service within the local area is initiated through a step S100 in which the local area wireless communication apparatus 100 receives contents to be broadcasted through the network connection such as the Internet.

Thereafter, in order to transmit broadcasting signals corresponding to the contents through three multi RF channels, the broadcasting signals are multiplexed to three broadcasting frame areas in step S102.

After the three broadcasting frames are synchronized based on the time axis in step S104, the synchronized broadcasting frames for the broadcasting signals are transmitted to the local area through each multi RF channel in step S106.

Next, when one or more user terminal apparatuses 200 located in the local area access the communication for executing the communication service through one multi RF channel (for example, the second multi RF channel) in step S108, the local area wireless communication apparatus 100 sets communication frames for transmitting/receiving communication signals through the accessed multi RF channel (for example, the second multi RF channel) in step S110.

The local area wireless communication apparatus 100 sets communication frames for the bidirectional communication service for transmission frames of other multi RF channels (for example, the first multi RF channel and the third multi RF channel) synchronized with the communication frames of the multi RF channel (for example, the second multi RF channel) in step S112.

Next, the local area wireless communication apparatus 100 transmits/receives communication signals to/from the user terminal apparatus 200 through the accessed multi RF channel (for example, the first RF channel) in step S114.

Further, when the communication frames pre-allocated for providing the communication service to the user terminal apparatus 200 end, the local area wireless communication apparatus 100 determines whether there is an additional broadcasting signal to be broadcasted to the local area in step S118.

When it is determined that there is the additional broadcasting signal in step S118, the above steps are repeated. When it is determined that there is no additional broadcasting signal in step S118, the process for delivering the traffic is terminated in step S120.

Although an exemplary embodiment of the present invention has been described for illustrative purposes, those skilled in the art will appreciate that various modifications, additions and substitutions are possible, without departing from the scope and spirit of the invention as disclosed in the accompanying claims.

INDUSTRIAL APPLICABILITY

The present invention intends to mount a plurality of multi RF (Radio Frequency) channels to minimize signal interference between mutually adjacent RF channels within a local area wireless communication apparatus in a standard for providing a broadcasting and communication convergence service. Therefore, the present invention has great potential in commercialization of the apparatus using and employing the related technologies as the apparatus overcomes the limitations of the conventional technology.

What is claimed is:

1. A local area wireless communication apparatus, comprising:
    two or more local area wireless communication units configured to transmit broadcasting signals to a local area through two or more radio frequency (RF) channels and to communicate communication signals with one or more user terminal apparatuses located in the local area through one RF channel of the two or more RF channels, wherein the broadcasting signals are unidirectional signals to the one or more user terminal apparatuses and the communication signals are bidirectional signals to and from the one or more user terminal apparatuses; and
    a controller configured
        to synchronize two or more broadcasting frames for the broadcasting signals allocated onto each of the two or more RF channels on a time axis, and,
        when one bidirectional communication frame for the communication signals has been allocated onto the one RF channel of the two or more RF channels, to allocate other bidirectional communication frames for the communication signals onto other RF channels of the two or more RF channels to thereby synchronize the allocated other bidirectional communication frames with the one bidirectional communication frame on the time axis.

2. The local area wireless communication apparatus of claim 1, further comprising:
    a network connector configured to connect the local area wireless communication apparatus with a network providing contents to be broadcasted.

3. The local area wireless communication apparatus of claim 1, wherein the local area wireless communication unit comprises:
    a chipset including a control circuit configured to receive the broadcasting signals and to transmit the received broadcasting signals to the local area or to communicate the communication signals with the user terminal apparatuses;
    an RF module configured to generate the broadcasting signals or the communication signals; and
    at least one antenna configured to transmit the broadcasting signals within the local area or to communicate the communication signals.

4. The local area wireless communication apparatus of claim 1, wherein the controller is configured to allocate the broadcasting frames and bidirectional communication frames according to a preset allocation ratio.

5. A method of minimizing interference between broadcasting signals and communication signals within a local area, the method performed by a local area wireless communication apparatus and comprising:
    multiplexing broadcasting signals corresponding to contents to be broadcasted through two or more radio frequency (RF) channels within a local area, wherein the broadcasting signals are unidirectional signals to one or more user terminal apparatuses;
    synchronizing two or more broadcasting frames of the broadcasting signals allocated onto the two or more RF channels on a time axis;
    transmitting the synchronized broadcasting frames for the broadcasting signals within the local area through the two or more RF channels;
    allocating, in response to a request for a communication service by the one or more user terminal apparatuses located in the local area, one bidirectional communication frame for communication signals onto one RF channel of the two or more RF channels after the broadcasting frames, wherein the broadcasting frames are unidirectional frames of the broadcasting signals, and the communication signals are bidirectional signals to and from the one or more user terminal apparatuses;
    allocating other bidirectional communication frames for the communication signals onto other RF channels of the two or more RF channels to thereby synchronize the allocated other bidirectional communication frames with the one bidirectional communication frame on the time axis; and
    communicating the communication signals with the one or more user terminal apparatuses located in the local area by using the synchronized one bidirectional communication frame and the allocated other bidirectional communication frames through the two or more RF channels.

6. The method of claim 5, further comprising:
    connecting with a network to receive the contents.

* * * * *